United States Patent Office 3,098,700
Patented July 23, 1963

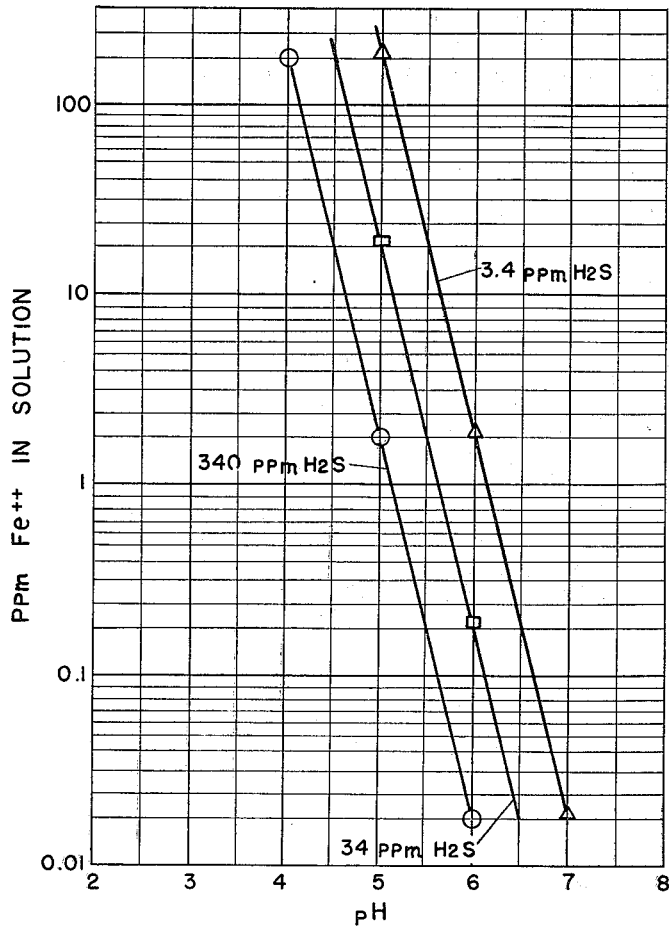

3,098,700
METHOD OF CONTROLLING CORROSION OF FERROUS METAL DUE TO PITTING BY ADDITION OF MINERAL ACID
George G. Bernard, Crystal Lake, Ill., assignor to The Pure Oil Company, Chicago, Ill., a corporation of Ohio
Filed Oct. 12, 1961, Ser. No. 144,660
4 Claims. (Cl. 21—2.7)

This invention relates to a method for mitigating pitting corrosion in water-distribution systems wherein the water contains ferrous ions, sulfate ions, and sulfate-reducing bacteria.

When sulfate ions, ferrous ions, and sulfate-reducing bacteria are present in water systems, a severe type of pitting corrosion generally occurs. The pitting is believed to be caused by the formation of galvanic cells on the pipe walls, these cells resulting in highly localized and rapid corrosion which perforates the pipe wall. Complete penetration of the pipe wall, with resultant leakage, within a period as short as three months is common. The conventional approach to this problem has been the use of bactericides to kill the sulfate-reducing bacteria. However, this approach has not proved to be altogether satisfactory because some types of bacteria are resistant to all known bactericides, and other types are known to develop an immunity to bactericides in a short time. Even the most effective known bactericides frequently leave enough living bacteria to cause serious pitting-corrosion problems.

It is, therefore, an object of this invention to provide an improved method for treating aqueous solutions containing sulfate ions, ferrous ions, and sulfate-reducing bacteria to mitigate localized corrosion in ferrous conduits or receptacles employed in water-distribution systems. Other objects of this invention will become apparent from the following description.

In accordance with this invention, localized pitting corrosion is mitigated or prevented entirely by maintaining the pH of the water at a level below that at which iron sulfide remains in solution, rather than its precipitating and forming on the pipe wall. In this way, the formation of localized galvanic cells is prevented, and pitting corrosion does not occur. It is recognized that this approach is contrary to the general teachings of the prior art, which eschewed the lowering of pH because it is known to increase the general corrosion rate of ferrous structures in contact with aqueous solutions. However, this generalized corrosion is much more tolerable than pitting corrosion because a pipe remains useful even after its wall thickness has been materially reduced by general corrosion, while even one perforation caused by rapid localized corrosion renders the entire length of pipe useless. Moreover, the generalized corrosion associated with reduced pH can be greatly reduced by conventional techniques, such as employing a suitable low-pH corrosion inhibitor. The extent to which the aqueous solutions must be acidified depends upon the initial pH of the untreated water, the concentration of ferrous ions in the water, the concentration of sulfate ions in the water, and the proportion of sulfate ions which may be expected to be reduced by sulfate-reducing bacteria present in the water. In the absence of reasons to conclude to the contrary, it is best to assume that all of the sulfate ions present will be reduced to sulfide ions.

The amount of acid which must be added to maintain the solubility of ferrous sulfide in the water can be determined from the equation $$(H^+)^2 = \frac{(Fe^{++})(H_2S)}{3.7 \times 10^3}$$

where:

$H^+$ is the hydrogen-ion concentration resulting from the addition of acid,
$Fe^{++}$ is the ferrous-ion concentration in the water, and,
$H_2S$ is the concentration of hydrogen sulfide which will result from the complete reduction of the sulfate-ion concentration of the water.

It will be evident that allowance must be made for the initial pH in calculating the amount of acid to be added. The pH to which the floodwater must be reduced, to prevent corrosion in the ferrous structures contacted by the water, for various concentrations of ferrous ions and hydrogen sulfide, is set out in the curves of the graph of FIGURE 1. By interpolating between these curves, those skilled in the art can readily determine the pH to which the water must be acidified to effectively control pitting corrosion. Thus, by resorting to the curves of the drawing, the need for tedious calculation can be avoided.

It is desirable that the pH of the water be lowered only to the extent necessary to prevent pitting-type corrosion, and no lower. In this manner the deleterious effect of general pipeline corrosion caused by the acid waters may be minimized. In the preferred method of carrying out the instant invention, a corrosion inhibitor is added to the water at the same time it is acidified, to reduce generalized corrosion to acceptable levels. Especially preferred as corrosion inhibitors for use in accordance with the method of this invention are compounds such as pyridine, quinoline, methyl pyridines, methyl quinolines, and their salts. Of these inhibitors, pyridine is especially preferred. The inhibitor should be added in amounts within the range of about 10 to 1,000 parts per million. Amounts smaller than 10 parts per million will seldom be effective, and the use of amounts in excess of 1,000 parts per million is not economically attractive. The exact amount of inhibitor added will depend upon factors such as the composition of the steel from which the protected structure is fabricated, and the extent to which the pH of the water is lowered.

Pitting corrosion of ferrous metal structures contacted by aqueous solutions containing ferrous ions, sulfate ions, and sulfate-reducing bacteria will be especially severe when the aqueous solution also contains oxygen in amounts of about 2 to 7 parts per millon. Where the oxygen concentration is much below 2 parts per million, severe pitting corrosion is less likely to occur, and where the oxygen concentration is much in excess of about 7 parts per million, the occurrence of ferrous ions in the water becomes unlikely, unless the oxygen is introduced to the water immediately upstream of the structure to be protected, as may occur at an air leak in a pipeline.

Severe pitting corrosion is frequently experienced in closed flood-water systems, the leak frequency sometimes being as high as about 30 leaks per month. Such water will frequently be found to contain sulfate-reducing bacteria, sulfate and sulfide ions, and ferrous ions. Attempts to alleviate the corrosion problem by adding various bactericides and corrosion inhibitors meet with only moderate success.

As a specific example of the method of this invention, such a system is treated by adding to the flowing system suitable quantities of hydrochloric acid and corrosion inhibitor. A typical corrosive water contains about 5 parts per millon of ferrous iron, and sulfate ions and sulfate-reducing bacteria in an amount capable of producing about 5 parts per million of $H_2S$. A typical water will also contain residual alkalinity in the amount of about 280 parts per million calcium carbonate equivalent. Inspection of the data shown in the drawing indicates that the precipitation of iron sulfide will be eliminated by reducing the pH of this water to about 5.7. By calculation, or by titration experiments, it is determined that to lower the pH of 1,000 barrels of this water to 5.7 requires about 77 pounds of concentrated (37%) hydrochloric acid, or about 87 pounds of concentrated sulfuric acid. The concentrated hydrochloric acid is selected and added to the floodwater in the amount of 77 pounds per 1,000 barrels of water treated. To control generalized corrosion resulting from the reduction in pH, the water is further treated by adding thereto 10 parts per million of pyridine. After the treatment has been applied for about two months, the leak frequency will be found to drop to about 1 leak per month. Generalized corrosion, while progressing at a more rapid rate than previously, will be found to be uniform throughout the exposed surface of the corrodible structure and occurring at the tolerable level of only 0.2 mil per year.

While the selection of the acid to be added to lower the pH of the water is a matter of choice, best results are obtained by employing mineral acids such as sulfuric and hydrochloric acids. The use of organic acids, such as citric acid, should be avoided.

The embodiments of this invention in which an exclusive property or privilege is claimed are as follows:

1. The method of mitigating pitting corrosion of ferrous metal structures contacted by aqueous solutions containing ferrous ions, sulfate ions, and sulfate-reducing bacteria comprising adding to said solutions mineral acid in about the minimum amount sufficient to prevent precipitation of ferrous sulfide.

2. The method in accordance with claim 1 including the step of adding to said solution a corrosion inhibitor in the amount of about 10 to 1,000 parts per million.

3. The method in accordance with claim 2 in which said inhibitor is of the group consisting of pyridine, quinoline, their methyl derivatives, and their mineral acid salts.

4. The method in accordance with claim 2 in which said solution contains oxygen in the amount of about 2 to 7 parts per million.

References Cited in the file of this patent

UNITED STATES PATENTS 2,965,577     Heimann et al. _____ Dec. 20, 1960

OTHER REFERENCES

Uhlig, Corrosion Handbook, John Wiley and Sons, Inc., New York, 1948, pp. 126, 170, 469, 477.